US012656607B2

(12) United States Patent
Ziemer et al.

(10) Patent No.: US 12,656,607 B2
(45) Date of Patent: Jun. 16, 2026

(54) LAMELLA ARRANGEMENT, METHOD FOR MANUFACTURING A LAMELLA ARRANGEMENT, COVER ASSEMBLY HAVING A LAMELLA ARRANGEMENT

(71) Applicant: Continental Automotive Technologies GmbH, Hannover (DE)

(72) Inventors: Jens Ziemer, Münster (DE); Michael Döbler, Seligenstadt (DE); Bjoern Hebestreit, Aschaffenburg (DE); Ulrich Tietz, Schaafheim (DE); Robert Wolfgang Kissel, Egelsbach (DE)

(73) Assignee: Continental Automotive Technologies GmbH, Hannover (DE)

( * ) Notice: Subject to any disclaimer, the term of this patent is extended or adjusted under 35 U.S.C. 154(b) by 211 days.

(21) Appl. No.: 18/291,478

(22) PCT Filed: Jun. 27, 2022

(86) PCT No.: PCT/DE2022/200143
§ 371 (c)(1),
(2) Date: Jan. 23, 2024

(87) PCT Pub. No.: WO2023/001343
PCT Pub. Date: Jan. 26, 2023

(65) Prior Publication Data
US 2025/0102800 A1      Mar. 27, 2025

(30) Foreign Application Priority Data

Jul. 23, 2021    (DE) ..................... 10 2021 207 972.5
Jul. 23, 2021    (DE) ..................... 10 2021 207 976.8

(51) Int. Cl.
*G02B 27/01*          (2006.01)

(52) U.S. Cl.
CPC ..... *G02B 27/0103* (2013.01); *G02B 27/0149* (2013.01); *G02B 2027/012* (2013.01); *G02B 2027/0154* (2013.01)

(58) Field of Classification Search
CPC ............ G02B 27/0103; G02B 27/0149; G02B 2027/012; G02B 2027/0154; G02B 27/0101; E06B 9/26
See application file for complete search history.

(56) References Cited

U.S. PATENT DOCUMENTS

2013/0101253 A1    4/2013  Popovich et al.
2016/0124223 A1    5/2016  Shinbo et al.
(Continued)

FOREIGN PATENT DOCUMENTS

CN        1128724        8/1996
CN        109085699 A    12/2018
(Continued)

OTHER PUBLICATIONS

Office Action dated Feb. 24, 2022 from corresponding German patent application No. 10 2021 207 972.5.
(Continued)

*Primary Examiner* — Charles S Chang
(74) *Attorney, Agent, or Firm* — COZEN O'CONNOR

(57)          ABSTRACT

The present disclosure relates to a lamella arrangement, for a cover assembly for a head-up display, and to a method for manufacturing such a lamella arrangement. The disclosure also relates to a cover assembly having such a lamella arrangement and to a head-up display, in particular a head-up display for a transport which has such a cover assembly. The lamella arrangement has a first rack having a plurality of teeth and a first cover rack strip arranged on the first rack and having a plurality of teeth. The lamella arrangement also has a second rack having a plurality of teeth and a second
(Continued)

cover rack strip arranged on the second rack and having a plurality of teeth. A plurality of lamellae are fastened between the teeth of the first and second racks and the first and second cover rack strips.

10 Claims, 11 Drawing Sheets

(56)                    References Cited

U.S. PATENT DOCUMENTS

| | | | | |
|---|---|---|---|---|
| 2016/0124233 | A1 | 5/2016 | Wei | |
| 2020/0183165 | A1* | 6/2020 | Hartwig | B60K 35/22 |
| 2023/0176375 | A1 | 6/2023 | Wolf | |
| 2023/0341680 | A1 | 10/2023 | Wille et al. | |

FOREIGN PATENT DOCUMENTS

| | | |
|---|---|---|
| CN | 211917689 | 11/2020 |
| DE | 102014214510 A1 | 1/2016 |
| DE | 102015224939 A1 | 6/2017 |
| DE | 102017219069 A1 | 4/2019 |
| DE | 102018213061 A1 | 1/2020 |
| DE | 102019132600 A1 | 6/2021 |
| DE | 102020205444 B3 | 7/2021 |
| DE | 102020211662 B3 | 7/2021 |
| EP | 0415275 A2 | 3/1991 |
| JP | H0893339 | 4/1996 |
| JP | 2008068767 A | 3/2008 |
| JP | 2020507128 A | 3/2020 |
| KR | 1020200026301 | 3/2020 |

OTHER PUBLICATIONS

International Search Report and Written Opinion dated Nov. 4, 2022 from corresponding International patent application No. PCT/DE2022/200143.

Office Action dated Mar. 29, 2022 from related German patent application No. 10 2021 207 976.8.

Decision to Grant issued Jan. 21, 2025 from corresponding Japanese patent application No. 2024-503935.

Office Action of corresponding Korean Patent Application No. 10-2024-7000741, dated May 23, 2025.

Office Action of corresponding Chinese Patent Application No. 202280048437.5, dated Mar. 20, 2026.

* cited by examiner

LAMELLA ARRANGEMENT, METHOD FOR MANUFACTURING A LAMELLA ARRANGEMENT, COVER ASSEMBLY HAVING A LAMELLA ARRANGEMENT

CROSS REFERENCE TO RELATED APPLICATIONS

This U.S. patent application claims the benefit of PCT application No. PCT/DE2022/200143, filed Jun. 27, 2022, which claims the benefit of German patent application No. 10 2021 207 972.5, filed Jul. 23, 2021, and of German patent application No. 10 2021 207 976.8, filed Jul. 23, 2021, all of which are hereby incorporated by reference.

TECHNICAL FIELD

The present disclosure relates to a lamella arrangement, in particular for a cover assembly for a head-up display, and to a method for manufacturing such a lamella arrangement. The disclosure also relates to a cover assembly having such a lamella arrangement and to a head-up display, in particular a head-up display for a transport which has such a cover assembly.

BACKGROUND

A head-up display, also referred to as HUD, is understood to mean a display system in which the observer may maintain his/her viewing direction since the contents to be represented are superimposed on his/her field of vision. While such systems were originally used primarily in the aviation sector due to their complexity and costs, they are now also being used in large-scale production in the automotive sector.

Head-up displays generally consist of an image generator, an optics unit, and a mirror unit. The image generator generates the image. The optics unit directs the image onto the mirror unit. The image generator is often also referred to as an imaging unit or PGU (picture generating unit). The mirror unit is a partially reflecting, light-transmissive pane. The observer thus sees the contents represented by the image generator as a virtual image and at the same time the real world behind the pane. In the automotive sector, the windshield is often used as mirror unit, and its curved shape must be taken into account in the representation. Due to the interaction between the optics unit and the mirror unit, the virtual image is an enlarged representation of the image generated by the image generator.

The observer may see the virtual image only from the position of the so-called eyebox. The eyebox refers to a region, the height and width of which correspond to a theoretical viewing window. As long as one eye of the observer is within the eyebox, all elements of the virtual image are visible to the eye. If, on the other hand, the eye is outside the eyebox, the virtual image is thus visible only partially or not at all to the observer. The larger the eyebox, the less restricted thus the observer is in choosing his/her seating position.

The size of the virtual image of conventional head-up displays is limited by the size of the optics unit. One approach for enlarging the virtual image is to couple the light coming from the image-generating unit into an optical waveguide. The light that is coupled into the optical waveguide and carries the image information undergoes total internal reflection at the boundaries thereof and is thus guided within the optical waveguide. In addition, a portion of the light is in each case coupled out at a multiplicity of positions along the propagation direction, so that the image information is emitted so as to be distributed over the surface of the optical waveguide. Owing to the optical waveguide, the exit pupil is in this way expanded. The effective exit pupil here is composed of images of the aperture of the image generation system.

Against this background, US 2016/0124223 A1 describes a display device for virtual images. The display device comprises an optical waveguide that causes light that emanates from an image-generating unit and is incident through a first light incidence surface to repeatedly undergo internal reflection in order to move in a first direction away from the first light incidence surface. The optical waveguide also has the effect that a portion of the light guided in the optical waveguide exits to the outside through regions of a first light exit surface which extends in the first direction. The display device further comprises a first light-incidence-side diffraction grating that diffracts incident light to cause the diffracted light to enter the optical waveguide, and a first light-emergent diffraction grating that diffracts light that is incident from the optical waveguide.

In the currently known design of such a head-up display, in which the optical waveguide consists of glass plates within which diffraction gratings or holograms are arranged, a problem arises in the case of solar radiation. The incident sunlight is refracted multiple times in the optical waveguide and decomposed into its spectral colors. These exit from the optical waveguide again at numerous locations and are refracted, inter alia, in the direction of the eye. This leads to rainbow-like or contrast-reducing losses of quality. As a result, the actual image is perceived only to be even weaker. Similar problems occur with other sources of stray light as well as with direct light reflections on the optical waveguide or on a cover of an optics unit. Even with conventional head-up displays without optical waveguides, light reflections due to sunlight or ambient light act disruptively.

In conventional apparatuses, components on which reflections may occur are therefore tilted and combined with beam traps so that reflections do not reach the region where the driver's eye is expected. Alternatively, antireflection coatings are employed and structural roughnesses are used in order to reduce the reflection intensity.

Tilting the components takes up significant installation space, which is limited in automobiles. Furthermore, the performance of the components is generally reduced for a tilted installation. Layers and structures lessen the achievable intensity, but the reflections generally remain clearly visible and significantly reduce the contrast.

To reduce reflections, the head-up display may alternatively be provided with a cover assembly, which has a lamella structure or a grid with a large number of lamellae, to reduce reflection. The lamellae may largely block incident stray light.

In this context, DE 10 2014 214 510 A1 describes an arrangement for reducing reflections for a windshield display device for a motor vehicle. The arrangement comprises a transparent cover plate for protecting a projection device and a shielding grid with flat grid elements of a grid structure arranged perpendicularly or inclined to a surface of the cover plate.

To further improve the suppression of stray light, adjustable lamellae may be used instead of a rigid lamella arrangement, the actuated angle of which is adjusted based on the observer's head position.

For example, DE 10 2017 219 069 A1 describes a cover assembly for reducing reflections for a field of view display device for a motor vehicle. The cover assembly comprises a transparent cover plate for protecting a projection unit of the field of view display device and a dynamic shielding structure which comprises a plurality of flat lamellae distributed along a surface of the cover plate. The angles of inclination of the lamellae to a surface normal of the cover plate may be dynamically adjusted.

However, manufacturing such a lamella arrangement involves considerable complexity, particularly if the lamellae are to be very thin. A typical material thickness of the lamellae is in the range of 20 μm to 30 μm depending on the material.

It is the object of the present disclosure to provide improved solutions for a lamella arrangement for a cover assembly for a head-up display.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to a first aspect of the disclosure, a lamella arrangement comprises a first rack having a plurality of teeth, a first cover rack strip arranged on the first rack and having a plurality of teeth, a second rack having a plurality of teeth, a second cover rack strip arranged on the second rack and having a plurality of teeth, and a plurality of lamellae which are fastened between the teeth of the racks and the cover rack strips.

In the lamella arrangement according to the disclosure, the lamellae at both sides at their ends are fastened between a rack and an associated cover rack strip. The teeth of the rack, or of the cover rack strip, respectively, determine the exact arrangement of the lamellae here. The lamellae for example have a constant distance and a constant angle of inclination over the entire length of the rack. Of course, both may also vary over the length of the rack if necessary, however.

According to one aspect of the disclosure, the racks, the cover rack strips and the lamellae are adhesively bonded to one another. In this way, the rack and the associated cover rack strip each form an adhesively bonded unit in which the ends of the lamellae are embedded. This makes it easier to handle the lamella arrangement during subsequent assembling in a frame of a cover assembly.

According to one aspect of the disclosure, the first rack and the second rack have fastening elements for support strips. The support strips may in turn be assembled in a frame of a cover assembly. The use of adapted support strips enables the lamella arrangement to be installed in different cover assemblies here.

According to one aspect of the disclosure, the lamellae are designed to be elastic. In this way, it is possible to adjust the angle of inclination of the lamellae after assembling in a cover assembly using suitable actuating elements. In particular, the lamellae may be formed by a plastic film. The lamellae are for example composed of a polyimide.

According to a further aspect of the disclosure, a method for manufacturing a lamella arrangement according to the disclosure comprises fastening a first rack and a second rack on an inner subframe, fastening a plurality of lamellae to a first auxiliary rack and a second auxiliary rack which are fastened to an outer subframe, incorporating the plurality of lamellae into the first rack and the second rack using the outer subframe, fastening the plurality of lamellae in the first rack and the second rack using a first cover rack strip and a second cover rack strip, separating the plurality of lamellae from the first auxiliary rack and the second auxiliary rack, and releasing the first rack and the second rack from the inner subframe.

In the method according to the disclosure for manufacturing a lamella arrangement, an auxiliary structure consisting of an outer subframe and auxiliary racks fastened thereto is used to bring the lamellae into a defined position before assembling. The outer subframe is then placed in relation to the inner subframe in such a way that the lamellae rest between the teeth of the racks. There the lamellae may then be fastened using cover rack strips and finally be separated from the auxiliary racks. The lamellae are transferred uniformly to the racks. After releasing the racks from the inner subframe, the lamella arrangement may be further processed.

According to one aspect of the disclosure, the racks, the cover rack strips and the lamellae are adhesively bonded to one another. In this way, the rack and the associated cover rack strip each form an adhesively bonded unit in which the ends of the lamellae are embedded. This makes it easier to handle the lamella arrangement during subsequent assembling in a frame of a cover assembly.

According to one aspect of the disclosure, the lamellae are tensioned with defined weights before being fastened to the auxiliary racks. In this way, all lamellae have exactly the same preload when they are fastened to the auxiliary racks and subsequently between the racks and the cover rack strips. After assembling the lamella arrangement in a frame of a cover assembly, it is ensured in this way that a defined force is required to adjust the inclination of the lamellae.

According to one aspect of the disclosure, the lamellae are adhesively bonded to the auxiliary racks. This ensures that the lamellae securely maintain their defined arrangement and preload when being incorporated into the racks.

Preferably, a cover assembly, in particular a cover assembly for a head-up display, has a lamella arrangement according to the disclosure. Such a cover assembly is for example used in a head-up display for a transport, for example in a head-up display for a motor vehicle. However, a lamella arrangement according to the disclosure may also be used in other areas of application in which reflection avoidance is desirable. Furthermore, the solution according to the disclosure may also be used as a privacy screen for displays, i.e. as a privacy filter, or as a privacy screen for windows/light dome windows.

Further features of the present disclosure will become apparent from the following description and the appended claims in conjunction with the figures.

DETAILED DESCRIPTION

For the better understanding of the principles of the present disclosure, embodiments of the invention will be explained in more detail hereunder by the figures. The same reference signs are used for identical or functionally equivalent elements in the figures and not necessarily described again for each figure. It goes without saying that the invention is not restricted to the embodiments illustrated and that the features described can also be combined or modified without departing from the scope of protection of the disclosure as defined in the appended claims.

First, the basic concept of a head-up display with an optical waveguide shall be explained by FIGS. 1 to 4.

Figure 1:
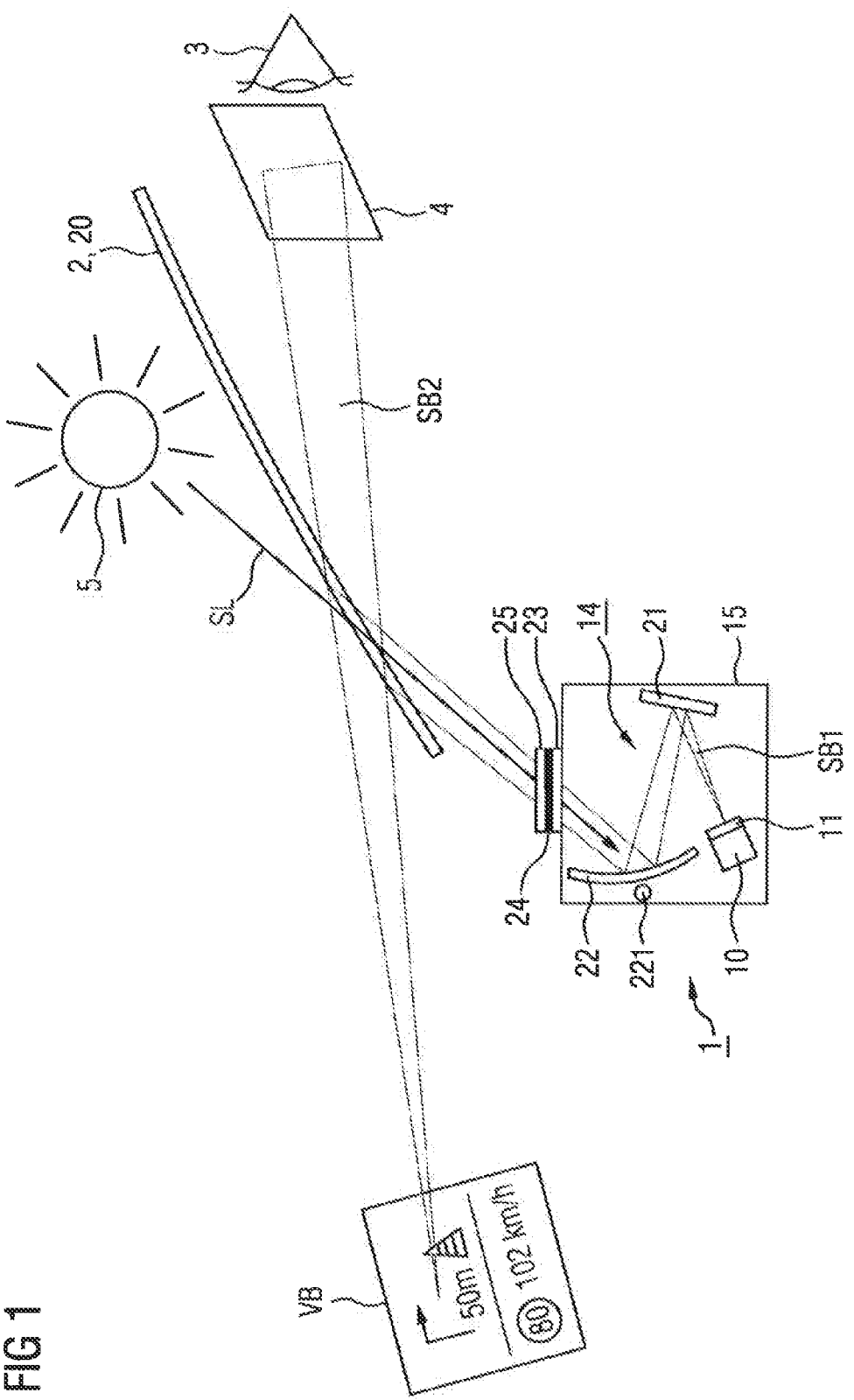
FIG. 1 schematically shows a head-up display according to the prior art for a motor vehicle.

FIG. 1 shows a schematic diagram of a conventional head-up display for a motor vehicle. The head-up display has a display device 1 with a imaging unit 10 and an optics unit 14. A beam SB1 emanates from a display element 11 and is reflected by a folding mirror 21 onto a curved mirror 22 that reflects said beam SB1 in the direction of a mirror unit 2. The mirror unit 2 is illustrated here as a windshield 20 of the motor vehicle. From there, the beam SB2 travels in the direction of an eye of an observer 3.

The observer 3 sees a virtual image VB that is located outside the motor vehicle above the engine hood or even in front of the motor vehicle. Due to the interaction between the optics unit 14 and the mirror unit 2, the virtual image VB is an enlarged representation of the image displayed by the display element 11. A speed limit, the current vehicle speed and navigation instructions are symbolically represented here. As long as the eye of the observer 3 is located within an eyebox 4, indicated by a rectangle, all elements of the virtual image VB are visible to the observer 3. If the eye of the observer 3 is located outside of the eyebox 4, the virtual image VB is only partially visible to the observer 3 or not at all. The larger the eyebox 4, the less restricted the observer is when choosing his/her seating position.

The curvature of the curved mirror 22 is adapted to the curvature of the windshield 20 and ensures that the image distortion is stable over the entire eyebox 4. The curved mirror 22 is rotatably mounted by a bearing 221. The rotation of the curved mirror 22 that this allows makes it possible to shift the eyebox 4 and thus to adapt the position of the eyebox 4 to the position of the observer 3. The folding mirror 21 serves to ensure that the path traveled by the beam SB1 between the display element 11 and the curved mirror 22 is long and at the same time the optics unit 14 is nevertheless compact. The imaging unit 10 and the optics unit 14 are separated from the environment by a housing 15 having a transparent cover plate 23. The optical elements of the optics unit 14 are thus protected, for example, against dust inside the vehicle. An optical film or a polarizer 24 may furthermore be located on the cover plate 23. The display element 11 is typically polarized, and the mirror unit 2 acts like an analyzer. The purpose of the polarizer 24 is therefore to influence the polarization in order to achieve uniform visibility of the useful light. A cover assembly 25 arranged on the cover plate 23 serves to reliably absorb the light reflected via the boundary of the cover plate 23 so that the observer is not dazzled. In addition to the sunlight SL, the light from another stray light source 5 may also reach the display element 11. In combination with a polarization filter, the polarizer 24 may additionally also be used to reduce incident sunlight SL.

Figure 2:
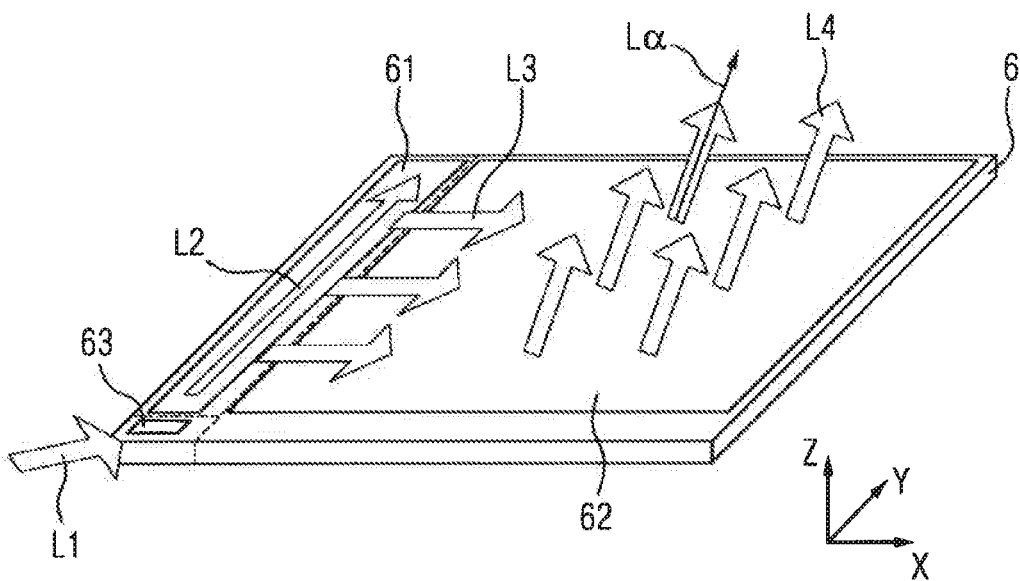
FIG. 2 shows an optical waveguide with two-dimensional enlargement.

FIG. 2 shows a schematic spatial illustration of an optical waveguide 6 with two-dimensional enlargement. An input coupling hologram 63, by which light L1 coming from an imaging unit (not shown) is coupled into the optical waveguide 6, is evident in the lower left region. It propagates therein upward to the right in the drawing, according to the arrow L2. In this region of the optical waveguide 6, there is a folding hologram 61 that acts similarly to many partially transmissive mirrors arranged one behind the other and generates a light beam that is broadened in the Y-direction and propagates in the X-direction. This is indicated by three arrows L3. In the part of the optical waveguide 6 that extends to the right in the figure, there is an output coupling hologram 62 that likewise acts similarly to many partially transmissive mirrors arranged one behind the other and couples out light, indicated by arrows L4, upward in the Z-direction from the optical waveguide 6. This widens in the X direction, so that the original incident light bundle L1 leaves the optical waveguide 6 in a light direction La as a light bundle L4 enlarged in two dimensions.

Figure 3:
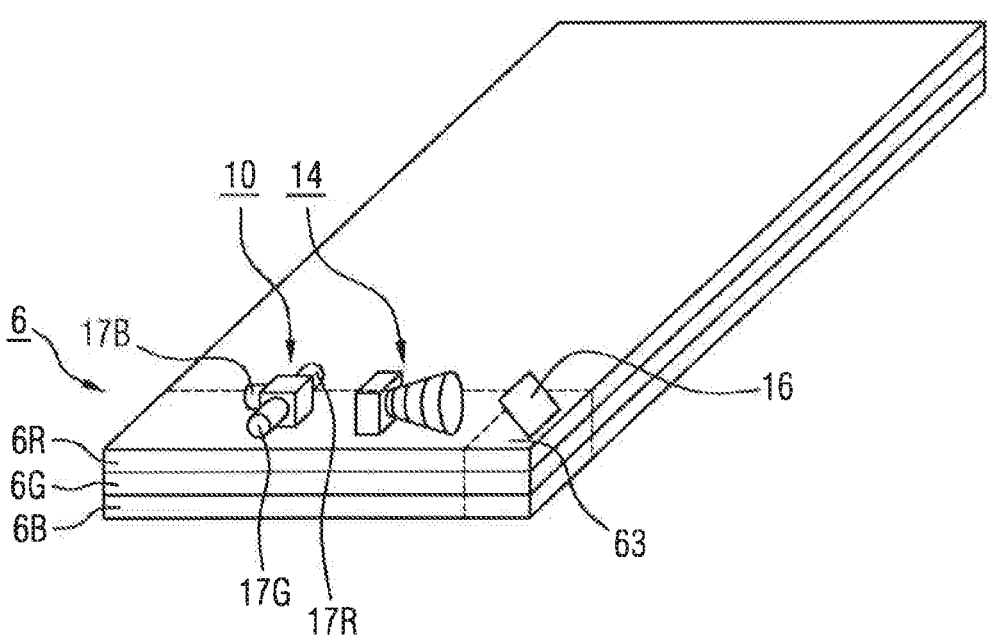
FIG. 3 schematically shows a head-up display with an optical waveguide.

FIG. 3 shows a spatial illustration of a head-up display with three optical waveguides 6R, 6G, 6B, which are arranged one above the other and each stand for an elementary color red, green, and blue. Conjointly they form the optical waveguide 6. The holograms 61, 62, 63 present in the optical waveguide 6 are wavelength-dependent, meaning that one optical waveguide 6R, 6G, 6B is used in each case for one of the elementary colors. An imaging unit 10 and an optics unit 14 are schematically shown above the optical waveguide 6. The optics unit 14 has a mirror 16 which deflects the light generated by the imaging unit 10 and shaped by the optics unit 14 in the direction of the respective coupling hologram 63. The imaging unit 10 has three light sources 17R, 17G, 17B for the three elementary colors. It is evident that the entire unit shown has a small overall structural height compared to its light-emitting surface.

Figure 4:
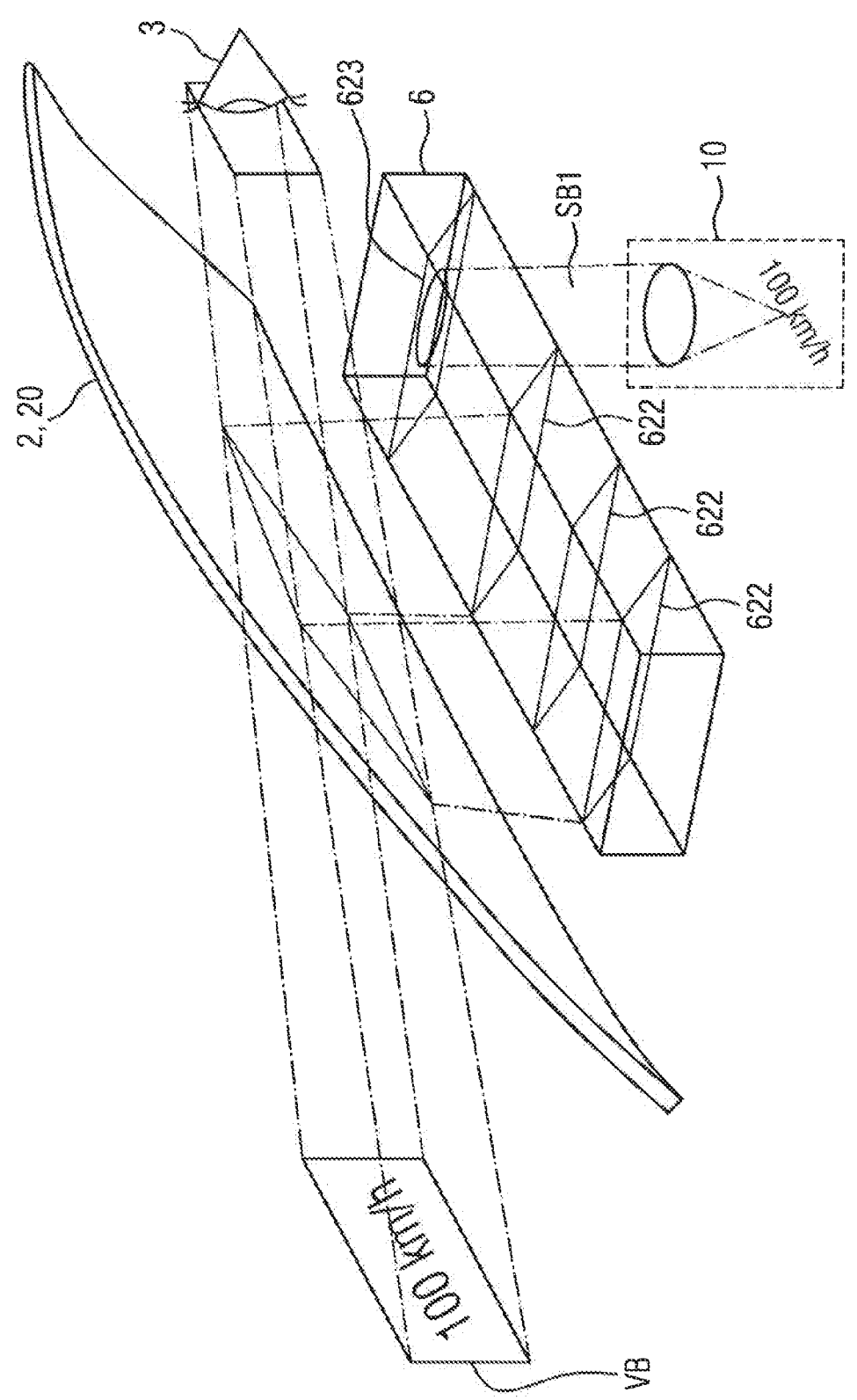
FIG. 4 schematically shows a head-up display with an optical waveguide in a motor vehicle.

FIG. 4 shows a head-up display in a motor vehicle similar to FIG. 1, but here in a spatial illustration and with an optical waveguide 6. The schematically indicated imaging unit 10, which generates a parallel beam SB1, is evident, the latter being coupled into the optical waveguide 6 by the mirror plane 623. The optics unit is not depicted for the sake of simplicity. A plurality of mirror planes 622 each reflect some of the light incident thereon into the direction of the windshield 20, the mirror unit 2. The light is reflected from this towards the observer 3. The observer 3 sees a virtual image VB above the hood or at an even further distance in front of the motor vehicle. With this technology, too, the entire optics are built into a housing that is delimited from the surroundings by a transparent cover and has a cover assembly to prevent stray light.

Figure 5:
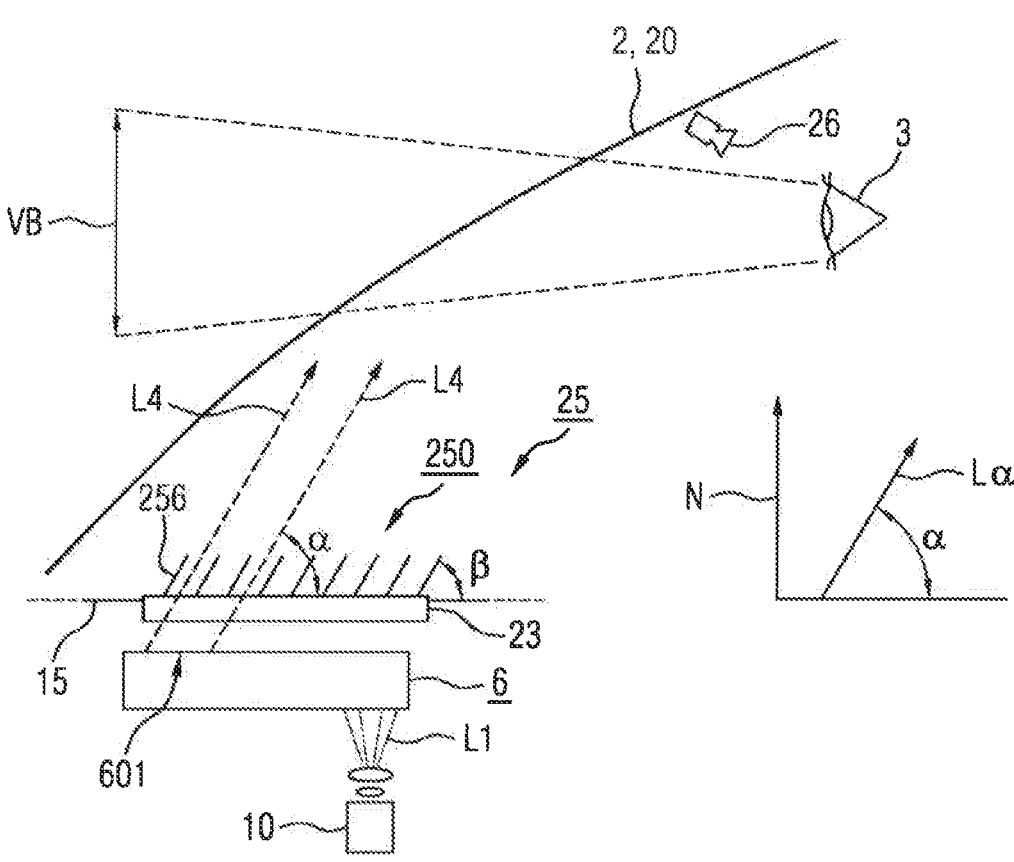
FIG. 5 schematically shows the operation of a cover assembly having lamellae.

FIG. 5 schematically shows the operation of a cover assembly 25 with adjustable lamellae 256. Illustrated is a cross section through the cover assembly 25, which in this example is integrated into the housing 15 together with the cover plate 23 and is arranged above an optical waveguide 6. An imaging unit 10 couples a light beam L1 into the optical waveguide 6. At its upper delimitation surface 601, multiplied light bundles L4 emerge at a main direction angle α. The light direction La defined by the main direction angle α deviates from the direction N of the normal of the optical waveguide 6, or of the housing 15, respectively. The light bundles L4 are reflected by the windshield 20, which serves as a mirror unit 2, and reach the eye of the observer 3, who thus sees a virtual image VB. For reasons of space, this is indicated here disproportionately close to the windshield 20. The cover assembly 25 comprises a lamella arrangement 250 having a plurality of inclined lamellae 256, which are aligned in accordance with the light direction Lα, i.e. whose angle of inclination β is adapted to the light direction Lα. The angle of inclination β may be adjusted using an adjusting element (not shown). An eye tracking system 26 may be used to track a position of the observer 3.

Figure 6:
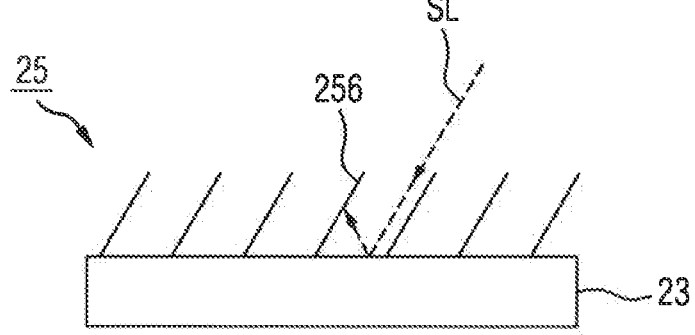
FIG. 6 shows an enlarged fragment of a cover assembly.

FIG. 6 shows an enlarged section of the cover assembly 25 from FIG. 5. Sunlight SL incident from outside may be seen as stray light. This may essentially only occur at the same angle at which the lamellae 256 are also inclined. It is therefore absorbed by the lamellae 256 after being reflected by the cover plate 23.

Figure 7:
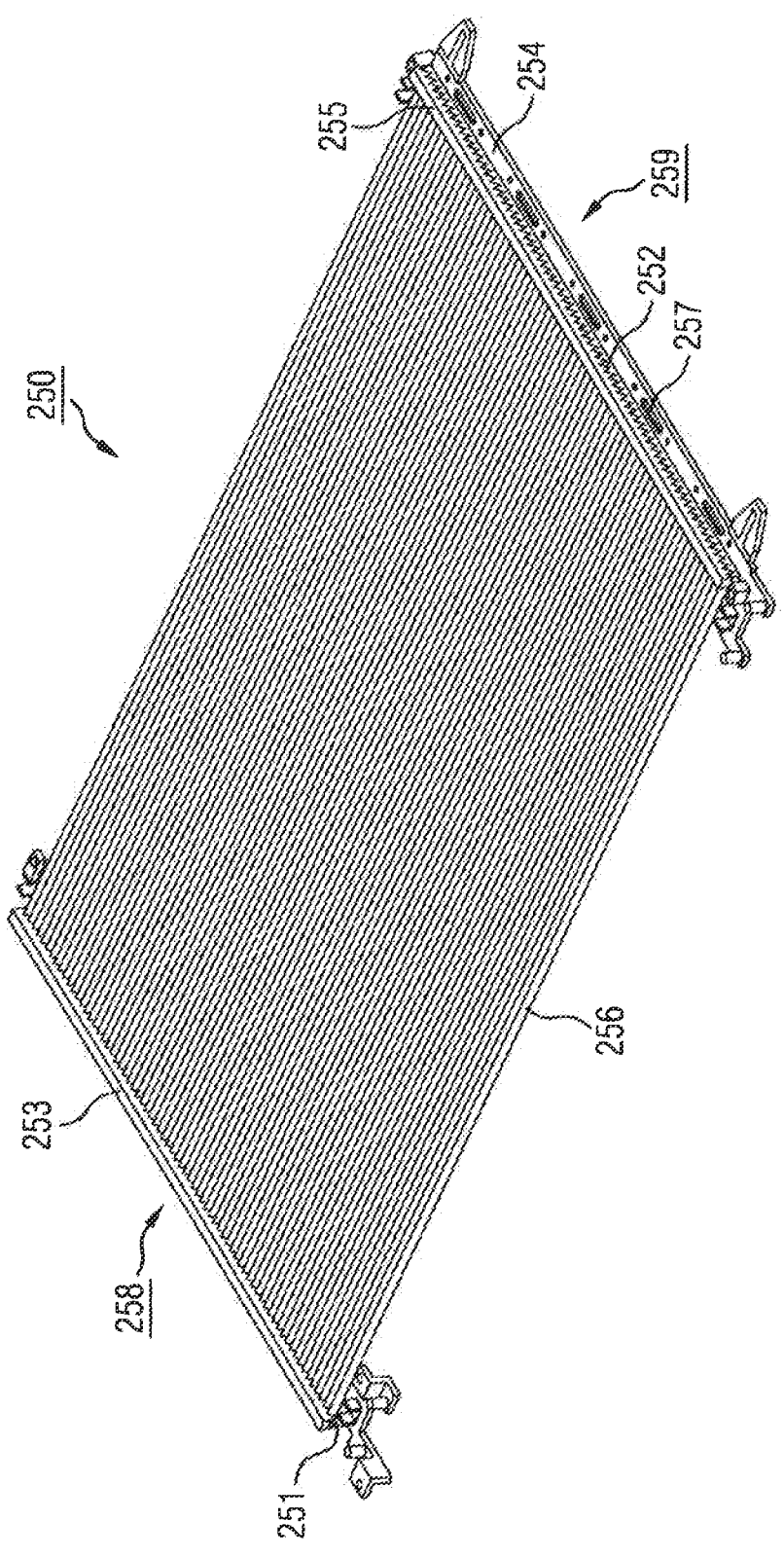
FIG. 7 shows an oblique view of a lamella arrangement according to the disclosure.
Figure 8:
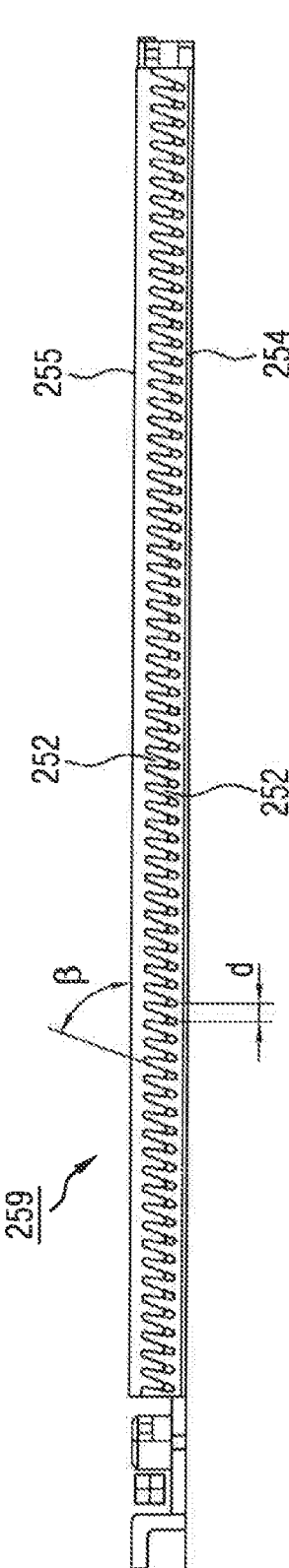
FIG. 8 shows a lateral view of the lamella arrangement according to the disclosure.

FIG. 7 and FIG. 8 show an oblique view and a lateral view of a lamella arrangement 250 according to the disclosure. The lamella arrangement 250 has a first rack 251 having a plurality of teeth 252 and a first cover rack strip 253, arranged on the first rack 251, having a plurality of teeth 252. The lamella arrangement 250 also has a second rack 254 having a plurality of teeth 252 and a second cover rack strip 255, arranged on the second rack 254, having a plurality of teeth 252. A plurality of lamellae 256 are fastened between the teeth 252 of the racks 251, 254 and the cover rack strips 253, 255. In particular, the racks 251, 254, the cover rack strips 253, 255 and the lamellae 256 may be adhesively bonded to one another and form a first end piece 258 and a second end piece 259. For example, the lamellae 256 are formed by a plastic film, for example a polyimide film. For the fastening of support strips for assembling in a cover assembly, the first rack 251 and the second rack 254 can have fastening portions 257. In the example shown, the lamellae 256 have a constant distance d and a constant angle of inclination β over the entire length of the rack 251. Of course, both may also vary over the length of the rack 251 if necessary, however.

Figure 9:
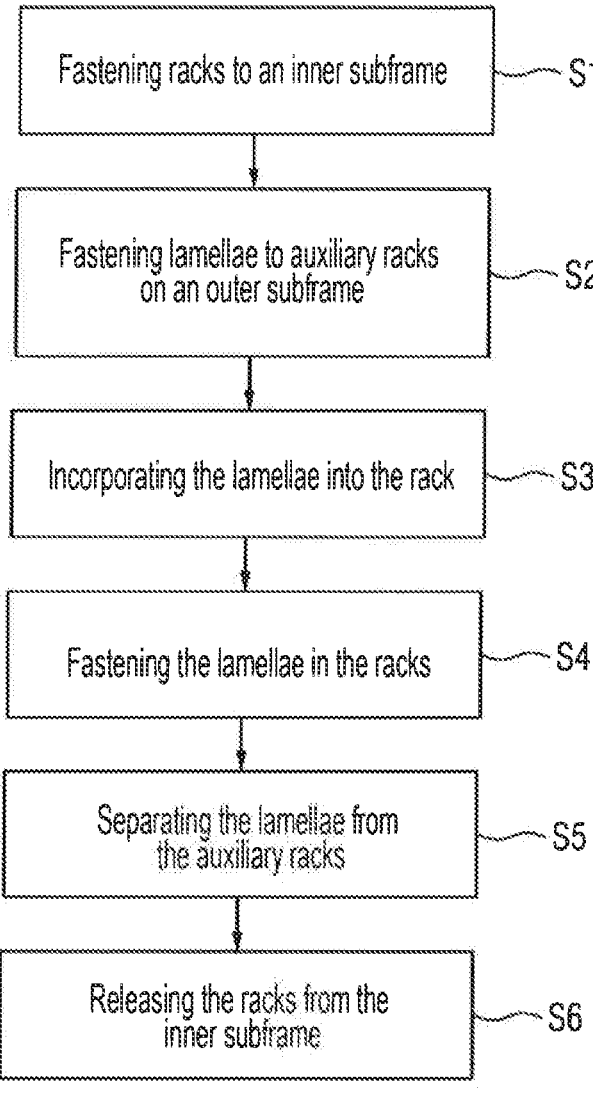
FIG. 9 schematically shows a method for manufacturing a lamella arrangement according to the disclosure.

FIG. 9 schematically shows a method for manufacturing a lamella arrangement according to the disclosure. First, a first rack and a second rack are fastened to an inner subframe S1. A plurality of lamellae are then fastened to a first auxiliary rack and a second auxiliary rack S2. The two auxiliary racks are fastened to an outer subframe. Before being fastened to the auxiliary racks, the lamellae are preferably tensioned with defined weights and then adhesively bonded to the auxiliary racks. The lamellae are then inserted into the first rack and the second rack using the outer subframe S3. Using a first cover rack strip and a second cover rack strip, the lamellae are then fastened in the racks S4. The racks, the cover rack strips and the lamellae are preferably adhesively bonded to one another for this purpose. The lamellae are then separated from the auxiliary racks S5. Finally the racks are released from the inner subframe S6.

Figure 10:
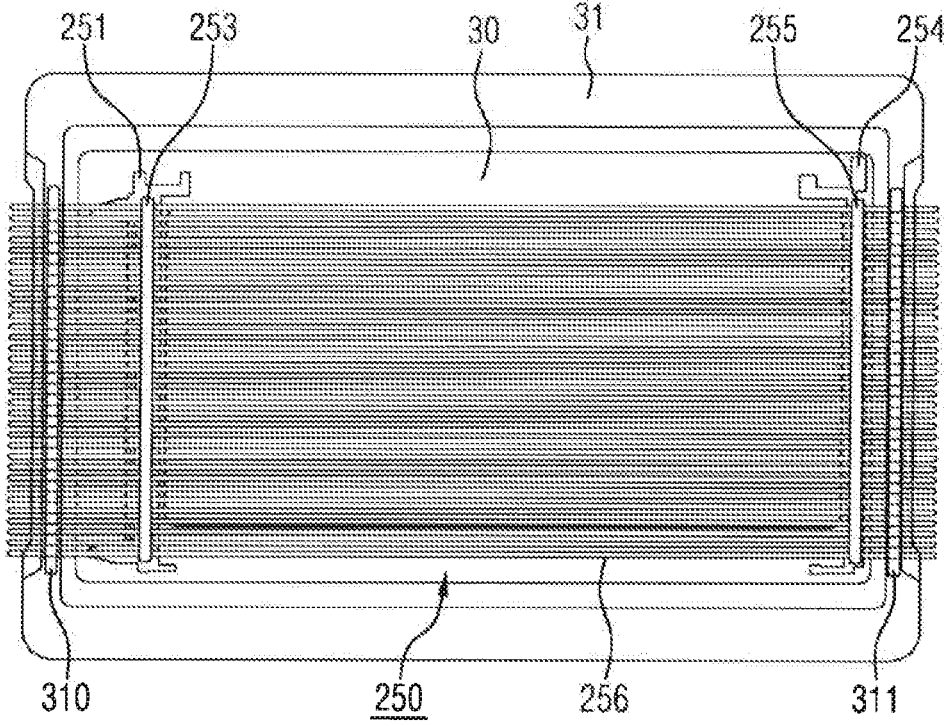
FIG. 10 shows the use of subframes in the production of a lamella arrangement according to the disclosure.

FIG. 10 shows the use of subframes 30, 31 in the production of a lamella arrangement 250 according to the disclosure. Two auxiliary racks 310, 311 are fastened to an outer subframe 31. The lamellae 256 are then adhesively bonded under tension to the outer subframe 31 on the auxiliary racks 310, 311. Two racks 251, 254 for receiving the lamellae 256 are fastened to an inner subframe 30. The outer subframe 31 with the tensioned lamellae 256 is then placed over the inner subframe 30, and the tensioned lamellae 256 are transferred or adhesively bonded to the racks 251, 254. Cover rack strips 253, 255 are then placed on the racks 251, 254 and adhesively bonded to them. The lamellae are now located in the sandwich between the rack 251, 254 and the cover rack strip 253, 255.

Figure 11:
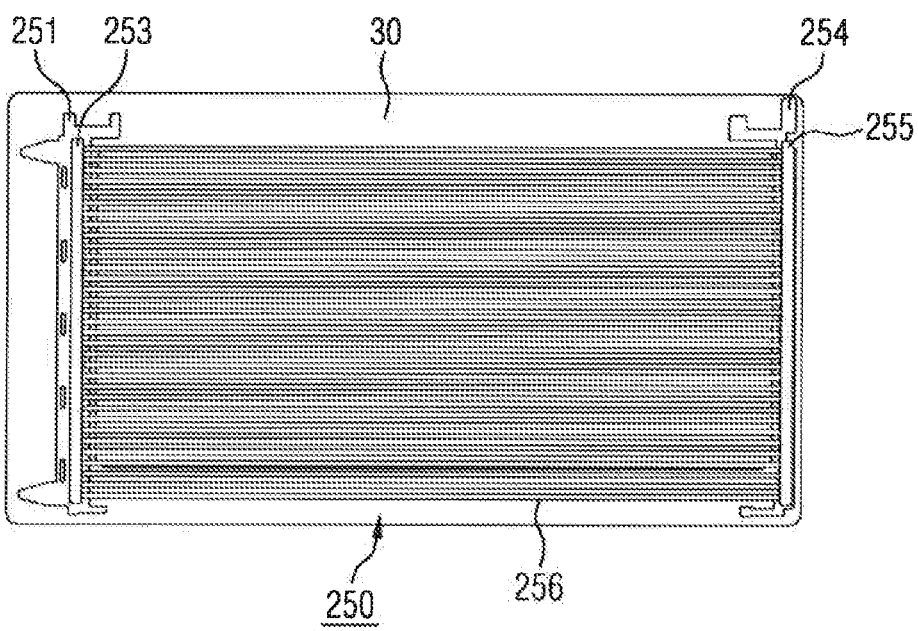
FIG. 11 shows the finished lamella arrangement before releasing from an inner subframe.

FIG. 11 shows the finished lamella arrangement 250 before being released from the inner subframe 30. After the lamellae 256 have been fastened between the racks 251, 254 and the cover rack strips 253, 255, the lamellae 256 are separated. The lamellae 256 are now uniformly transferred to the racks 251, 254. Finally, the racks 251, 254 only have to be released from the inner subframe 30.

Figure 12:
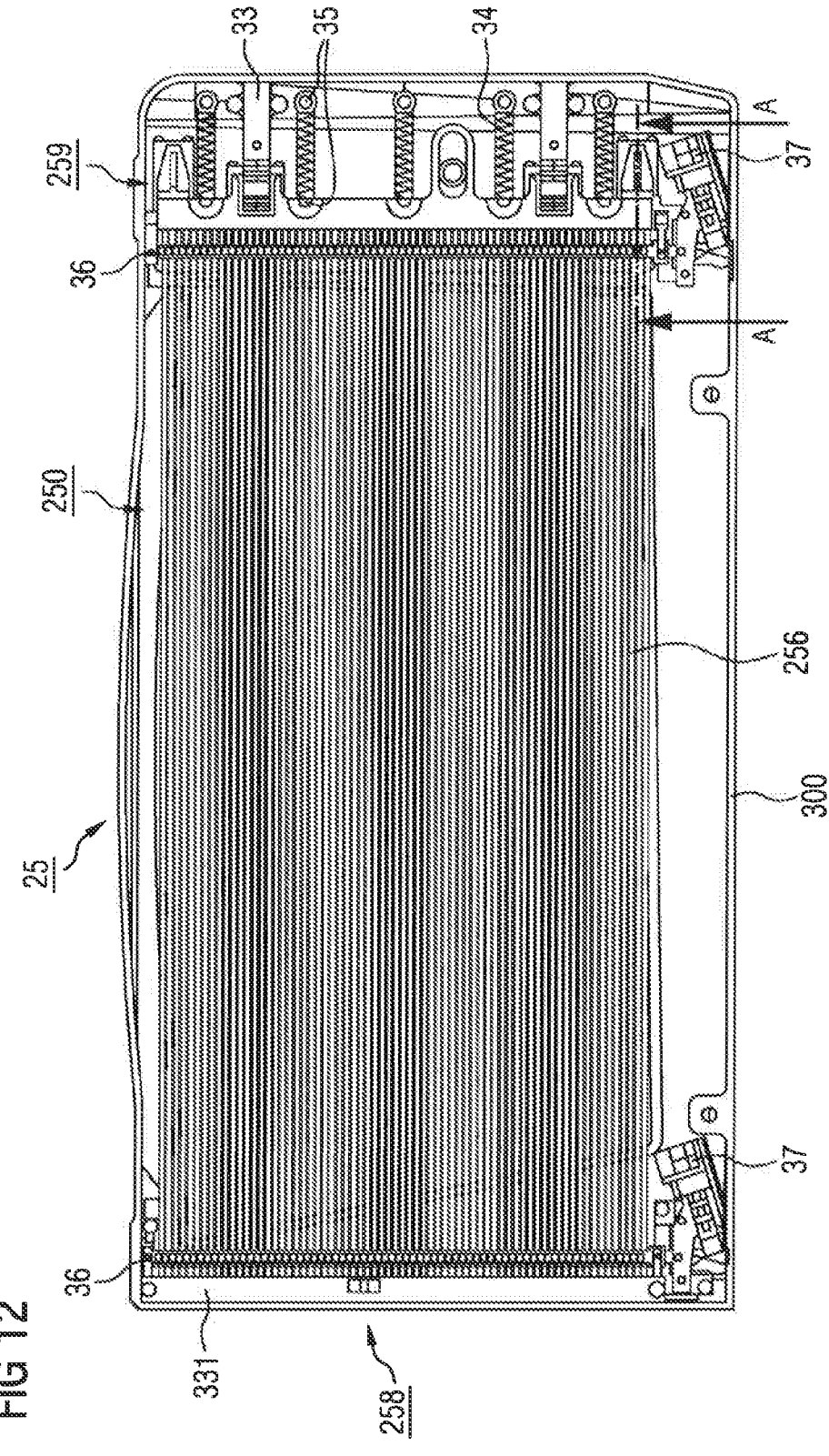
FIG. 12 shows an integration of the lamella arrangement from FIG. 7 into a cover assembly.

FIG. 12 shows an integration of the lamella arrangement 250 from FIG. 7 into a cover assembly 25. The cover assembly 25 has a frame 300 to which the two end pieces 258, 259 may be fastened. In the example shown, the first end piece 258 is fastened to the frame 300 with a first support strip 331, for example by adhesive bonding or screwing, and thus forms a fixed bearing for the lamellae 256. Alternatively, the first support strip 331 can be dispensed with and the first end piece 258 may be fastened directly to the frame 300. The second end piece 259, in contrast, is fastened in a spring-loaded manner and forms a floating bearing for the lamellae 256. For this purpose, the second end piece 259 is first screwed, pinned or adhesively bonded to a second support strip 32. The unit consisting of the second end piece 259 and the second support strip 32 is placed on the frame 300 and held down with springs 33. In the example shown, two springs 33 are used, but a different number of springs 33 may also be used. Instead of springs 33, other options for holding down may additionally also be used, for example lateral guides for the second support strip 32 or a movable fastening using elongate holes in the second support strip 32. The lamellae 256 are then tensioned by tension springs 34, which are fastened to fastening points 35 of the second support strip 32 and the frame 300. In the example shown, five tension springs 34 are used, but a different number of tension springs 34 may also be used. To adjust the inclination of the lamellae 256, the cover assembly 25 has adjusting elements 36, which are actuated by stepper motors 37.

Figure 13:
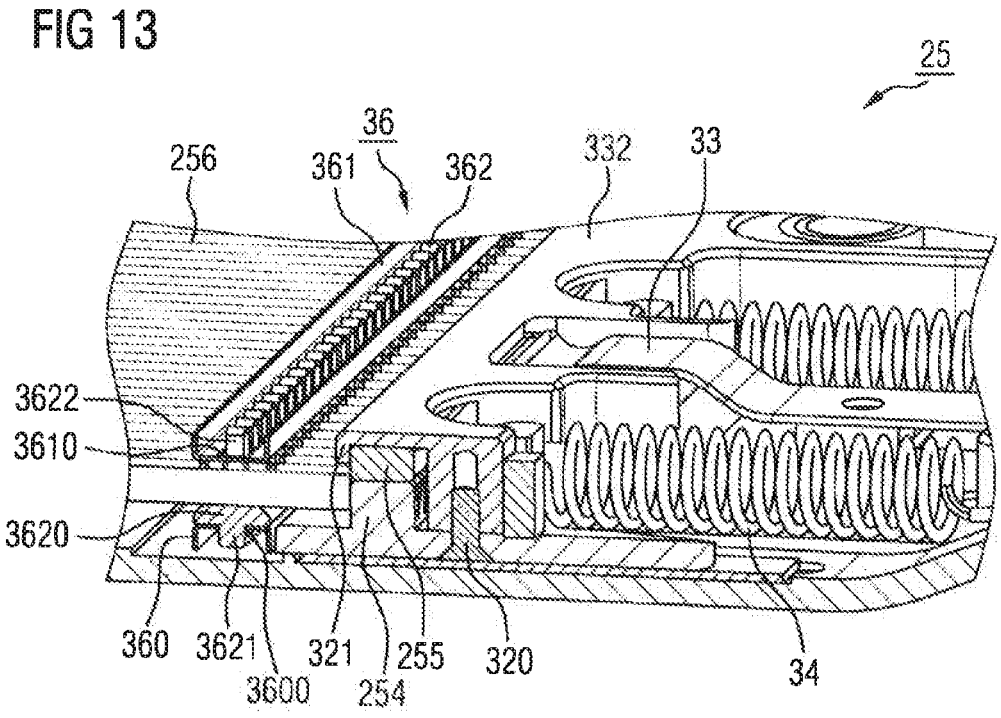
FIG. 13 shows a section through the cover assembly from FIG. 12.

FIG. 13 shows a section through the cover assembly 25 from FIG. 12 along the line A-A. The second support strip 332 is screwed to the second rack 254 by means of a screw 320. As described, the second rack 254 and the second cover rack strip 255 form a unit by the adhesive bond. In the embodiment illustrated, the second support strip 332 encompasses the second cover rack strip 255. For this purpose, the second support strip 332 has a bridging section 321. The tensile force of the tension springs 34 is transferred to the rigid second support strip 332. The force is transmitted on the one hand via the interlock to the second cover rack strip 255 and via the screw connection to the second rack 254. This places a central load on the adhesive bond of the lamellae 256 in the sandwich. The springs pull in the center of the lamellae 256. The resulting tension of the lamellae 256 protects the lamellae 256 from vibration. Moreover, the spring-loaded fastening ensures compensation for temperature-related changes in the longitudinal expansion of the lamellae 256.

As may be readily seen in FIG. 13, the adjusting element 36 comprises a lower perforated strip 360, an upper perforated strip 361, and a plurality of actuators 362. Each lamella 256 is assigned an actuator 362 of the adjusting element 36 here. The actuators 362 each have a main body 3620 as well as a lower appendage 3621 and an upper appendage 3622. The lower appendage 3621 engages in an assigned cutout 3600 in the lower perforated strip 360, the upper appendage 3622 in an assigned cutout 3610 in the upper perforated strip 361. The cutouts 3600, 3610 of the perforated strips 360, 361 are of a preferably rectangular design. The rectangular design, in conjunction with a substantially rectangular cross section of the lower appendage 3621 and the upper appendage 3622, ensures that the actuators 362 have a defined orientation with respect to the perforated strips 360, 361 and twisting of the actuators 362 relative to the perforated strips 360, 361 is not possible.

One of the first assembling steps of the cover assembly 25 lies in that the lower perforated strip 360 is fixedly connected to the frame 300. The lamella arrangement 250 is then placed, and the lamellae 256 are tensioned as described above. Now the actuators 362 are placed between the tensioned lamellae 256 in such a way that their lower appendage 3621 engages in each case in the associated cutout 3600 of the lower perforated strip 360. For this purpose, it is advantageous if groups of actuators 362, or even all actuators 362, are grouped together by a common sprue. The latter may, for example, be arranged laterally at the upper end of the main body 3620. The upper perforated strip 361 is then placed in such a way that the upper appendage 3622 of the actuators 362 each engages in the associated cutout 3610 of the upper perforated strip 361. Finally, the actuators 362 are separated by breaking off the sprue. The lower perforated strip 360 is for example arranged on the frame 300 in such a way that the lamellae 256 each rest on one side of the main body 3620 after assembling. By resting the lamellae 256 on the main body 3620, the shape of the lamellae 256 can be influenced in a targeted manner in the transverse direction. If the main body 3620 is designed to be flat in the region in which the associated lamella 256 rests, the lamella 256 also has a flat surface.

Figure 14:
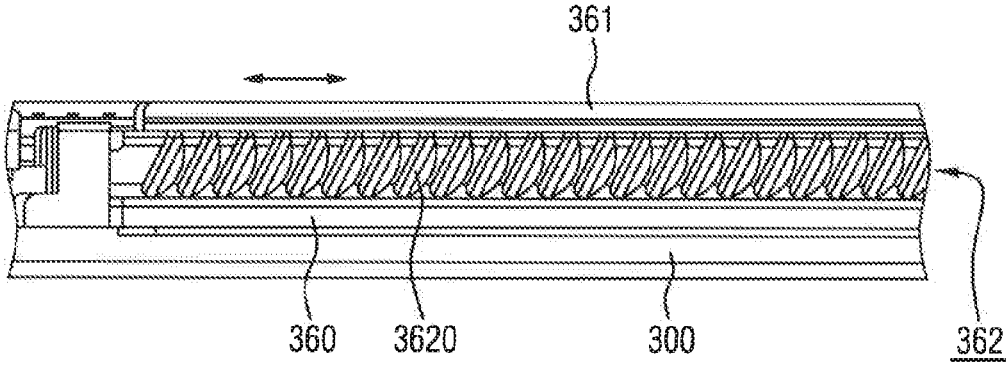
FIG. 14 illustrates the operation of an adjusting element for the lamellae of the lamella arrangement.

FIG. 14 visualizes the operation of the adjusting element 36 for the lamellae of the lamella arrangement. The lower perforated strip 360 is firmly arranged on the frame 300. To adjust the inclination, the upper perforated strip 361 is moved horizontally in the longitudinal direction by the stepper motor, parallel to the lower perforated strip 360. This displacement is indicated by the double arrow in FIG. 14. As a result of the displacement, all actuators 362 are tilted at the same time. Since the lamellae are elastic, they adjust according to the inclination of the actuators 362. The main bodies 3620 of the actuators 362 preferably have a convex shape. For this purpose, the side of the main body 3620 facing away from the respective lamella can preferably be designed to be curved. Due to the curvature, the main body 3620 can roll on the surface of the lower perforated strip 360 during the adjustment, which ensures a smooth adjustment. The actuators 362 or the main bodies 3620 of the actuators 362 are also designed in such a way that the lamellae may slide on the actuators 362. In this way, the possibility of a relative movement between the actuators 362 and the lamellae is guaranteed so that damage to the lamellae is prevented, even over a long period of time.

Figure 15:
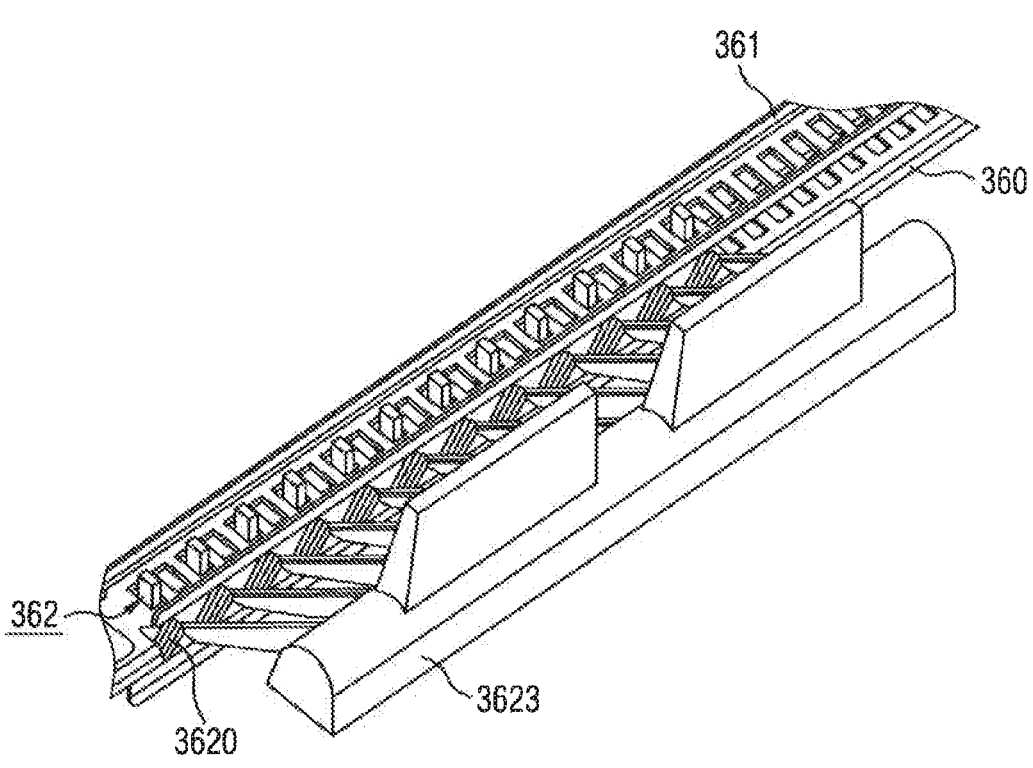
FIG. 15 shows a plurality of actuators grouped together by a common sprue.

FIG. 15 shows a plurality of actuators 362, which for the purpose of easy assembling are grouped together by a common sprue 3623 between the lower perforated strip 360 and the upper perforated strip 361. The sprue 3623 is arranged laterally at the upper end of the main body 3620 in such a way that the remains of the sprue 3623 do not touch the lamellae after the former has been broken off. This guarantees that the lamellae are not damaged.

The invention claimed is:

1. A lamella arrangement, comprising:
   a first rack having a plurality of teeth;
   a first cover rack strip arranged on the first rack and having a plurality of teeth;
   a second rack having a plurality of teeth;
   a second cover rack strip arranged on the second rack and having a plurality of teeth; and
   a plurality of lamellae which are fastened between the teeth of the first and second racks and the first and second cover rack strips.

2. The lamella arrangement as claimed in claim 1, wherein the first and second racks, the first and second cover rack strips and the plurality of lamellae are adhesively bonded to one another.

3. The lamella arrangement as claimed in claim 1, wherein the first rack and the second rack have fastening portions for support strips.

4. The lamella arrangement as claimed in claim 1, wherein the plurality of lamellae are designed to be elastic.

5. A method for manufacturing a lamella arrangement, the method comprising:
   fastening a first rack and a second rack on an inner subframe;
   fastening a plurality of lamellae to a first auxiliary rack and a second auxiliary rack which are fastened to an outer subframe;
   incorporating the plurality of lamellae into the first rack and the second rack using the outer subframe;
   fastening the plurality of lamellae in the first rack and the second rack using a first cover rack strip and a second cover rack strip;
   separating the plurality of lamellae from the first auxiliary rack and the second auxiliary rack; and
   releasing the first rack and the second rack from the inner subframe.

6. The method as claimed in claim 5, wherein the first and second racks, the first and second cover rack strips and the plurality of lamellae are adhesively bonded to one another.

7. The method as claimed in claim 5, wherein the plurality of lamellae are tensioned with defined weights before being fastened to the first and second auxiliary racks.

8. The method as claimed in claim 5, wherein the plurality of lamellae are adhesively bonded to the first and second auxiliary racks.

9. A cover assembly, the cover assembly comprising:
   a lamella arrangement comprising:
      a first rack having a plurality of teeth;
      a first cover rack strip arranged on the first rack and having a plurality of teeth;
      a second rack having a plurality of teeth;
      a second cover rack strip arranged on the second rack and having a plurality of teeth; and
      a plurality of lamellae which are fastened between the teeth of the first and second racks and the first and second cover rack strips.

10. A head-up display for a transport, the head-up display comprising:

a cover assembly, the cover assembly comprising:

a lamella arrangement comprising:

a first rack having a plurality of teeth;

a first cover rack strip arranged on the first rack and having a plurality of teeth;

a second rack having a plurality of teeth;

a second cover rack strip arranged on the second rack and having a plurality of teeth; and a plurality of lamellae which are fastened between the teeth of the first and second racks and the first and second cover rack strips.

\* \* \* \* \*